US010118608B1

(12) United States Patent
Dudar (10) Patent No.: US 10,118,608 B1
(45) Date of Patent: Nov. 6, 2018

(54) METHOD FOR ENGINE LASER IGNITION SYSTEM

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/793,246

(22) Filed: Oct. 25, 2017

(51) Int. Cl.
    *F02P 23/04* (2006.01)
    *B60W 20/50* (2016.01)
    *B60W 10/08* (2006.01)
    *B60W 10/06* (2006.01)
    *F02P 17/12* (2006.01)

(52) U.S. Cl.
    CPC ............ *B60W 20/50* (2013.01); *B60W 10/06* (2013.01); *B60W 10/08* (2013.01); *F02P 23/04* (2013.01); *B60W 2710/065* (2013.01); *F02P 17/12* (2013.01)

(58) Field of Classification Search
    CPC ...... F02P 17/00; F02P 17/12; F02P 2017/123; F02P 23/04; B60W 20/50
    See application file for complete search history.

(56) References Cited

U.S. PATENT DOCUMENTS

| 9,188,505 | B2* | 11/2015 | Martin | G01M 15/02 |
| 9,222,455 | B2* | 12/2015 | Martin | F02P 23/04 |
| 9,617,967 | B2 | 4/2017 | Martin et al. | |
| 2006/0032471 | A1* | 2/2006 | Yalin | F02P 23/04 |
|  |  |  |  | 123/143 B |
| 2006/0037572 | A1* | 2/2006 | Yalin | F02D 35/022 |
|  |  |  |  | 123/143 B |
| 2014/0316622 | A1* | 10/2014 | Martin | B60W 10/06 |
|  |  |  |  | 701/22 |
| 2015/0005997 | A1* | 1/2015 | Martin | F02P 23/04 |
|  |  |  |  | 701/22 |
| 2016/0040644 | A1* | 2/2016 | Martin | F02P 5/152 |
|  |  |  |  | 701/102 |
| 2018/0171962 | A1* | 6/2018 | Fiveland | F02P 17/12 |

FOREIGN PATENT DOCUMENTS

WO       9811388 A1    3/1998

OTHER PUBLICATIONS

Marshall, L., "Laser Car Ignition Dream Sparks Multiple Approaches," Photonics Website, Available Online at https://www.photonics.com/Article.aspx?AID=51731, Sep. 2012, 13 pages.
"Ignition Systems of the Future," Part Info Website, Available Online at https://web.archive.org/web/20140102072520/ http://www.partinfo.co.uk/articles/218, Available as early as Jan. 2, 2014, 3 pages.
Dudar, Aed, "Systems and Methods for a Variable Displacement Engine," U.S. Appl. No. 15/468,013, filed Mar. 23, 2017, 74 pages.

* cited by examiner

Primary Examiner — Thomas Moulis
(74) Attorney, Agent, or Firm — Julia Voutyras; McCoy Russell LLP (57) ABSTRACT

Methods and systems are provided for diagnosing a laser ignition system of an engine. In one example, a controller may operate the laser in a sealed cylinder hours after key-off. Then, the cylinder may be unsealed and a change in exhaust temperature may be correlated with laser functionality.

20 Claims, 4 Drawing Sheets

METHOD FOR ENGINE LASER IGNITION SYSTEM

FIELD

The present description relates to methods and systems for a laser ignition system.

BACKGROUND/SUMMARY

Engine systems on vehicles, such as hybrid electric vehicles (HEV) and vehicles configured for idle-stop operations, may be configured with a laser ignition system. The laser ignition system includes a laser coupled to each combustion chamber for igniting fuel. In addition to initiating cylinder combustion, the laser ignition system may also be used during engine starting to accurately determine the position of a piston in each cylinder. Laser ignition systems may provide various advantages over spark plugs which tend to degrade over time due to chemical changes at the cathode/anode and accumulation of particulate matter.

Laser ignition systems may also be used for misfire detection. One example approach is shown by Martin et al. in U.S. 20160040644. Therein, after a laser ignition system is used to ignite an air-fuel mixture in a cylinder, a temperature profile of the cylinder is sensed over the combustion event via an infra-red sensor. A misfire event is then determined based on the generated temperature profile relative to an expected profile.

However, the inventors herein have identified a potential issue with such an approach. A misfire may be identified when the cylinder does not produce sufficient torque. There may be various reasons for a cylinder to misfire, and a controller may perform different misfire mitigating actions based on the nature of the misfire. In the approach of Martin, if the laser device of the laser ignition system is degraded, the cylinder will also not produce any torque on a combustion event, generating a misfire. Consequently, the controller may be confounded as to the reason for the misfire. For example, it may be difficult for the controller to determine if the misfire was due to laser ignition system degradation, an air-fuel mixture having a richer than intended (e.g., richer than stoichiometric) air-fuel ratio, leaky intake or exhaust valves, a plugged fuel injector, hot cylinder walls, etc.

In one example, the above issue may be addressed by a method for diagnosing the laser ignition system so as to differentiate laser degradation induced cylinder misfire from other misfire causes. One example method includes spinning an engine unfueled to establish a baseline exhaust temperature and then seal a cylinder at a position of negative valve overlap; operating a laser ignition device in the sealed cylinder; spinning the engine unfueled to unseal the cylinder; and diagnosing the laser ignition device based on a change in measured exhaust temperature relative to the baseline exhaust temperature. In this way, a laser ignition system may be more robustly diagnosed while minimizing noise factors.

As an example, after an engine soak to ambient temperature conditions during a key-off condition, an engine controller (e.g., an engine's powertrain control module or PCM) may wake up to diagnose the laser ignition system. The controller may spin the engine unfueled for a duration (e.g., for 15 seconds) and a baseline temperature for the (unfueled and un-combusted) exhaust stream may be established with the laser ignitors coupled to all the cylinders deactivated. In one example, where the exhaust passage includes a particulate filter, the exhaust stream temperature may be measured by a temperature sensor coupled to the filter. Once the baseline exhaust temperature is established, the controller may spin the engine slowly to a position where a first cylinder, selected for laser ignition diagnostics, is sealed. Specifically, at the position, both the intake and exhaust valves of the selected first cylinder may be fully closed, such as at a position of negative intake to exhaust valve overlap. The laser of the sealed cylinder is then activated, which causes heat to be generated in the cylinder (since there is no fuel to combust), and then trapped therein due to the valves being closed. After a duration of laser operation, the laser is deactivated and the engine is spun, unfueled, to a position where the valves are open and the heated air from the cylinder is released. A subsequent rise in the exhaust temperature (relative to the baseline value) following the engine spinning indicates that the laser coupled to the first cylinder is functioning. Else, if the temperature does not rise, it may be determined that the laser coupled to the first cylinder is not functioning and a diagnostic code with a unique identifier for the first cylinder may be set. The controller may then proceed to re-establish a baseline exhaust temperature and similarly assess remaining cylinders, one at a time, by sealing the cylinder and operating the laser ignition device in the sealed cylinder.

In this way, the ability of laser ignitors to heat a metallic object upon impingement of the laser beam can be advantageously leveraged to diagnose the laser coupled to each cylinder. The technical effect of sealing a cylinder by spinning the engine to a position where cylinder valves are closed, and operating the laser in the sealed cylinder, is that a temperature inside the cylinder can be raised. By then spinning the cylinder to open the valves, the additional heat can be transferred to an exhaust stream. By comparing the change in exhaust temperature following the opening of the cylinder valves relative to a previously established baseline temperature, the heat transfer from the laser ignition device can be measured, and the functionality of the laser can be inferred. By relying on the laser's motive energy and resultant heat generation during engine-off conditions, the laser can be diagnosed robustly and without confounding the results with noise factors from engine combustion. By performing the diagnostic sequentially on all engine cylinders, individual cylinder laser systems can be accurately diagnosed. By enabling a laser ignition system to be diagnosed, engine misfires due to ineffective laser operation in an engine system configured with laser ignition can be better distinguished from other misfire causes. Consequently, engine misfires may be mitigated in a timely and appropriate manner.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
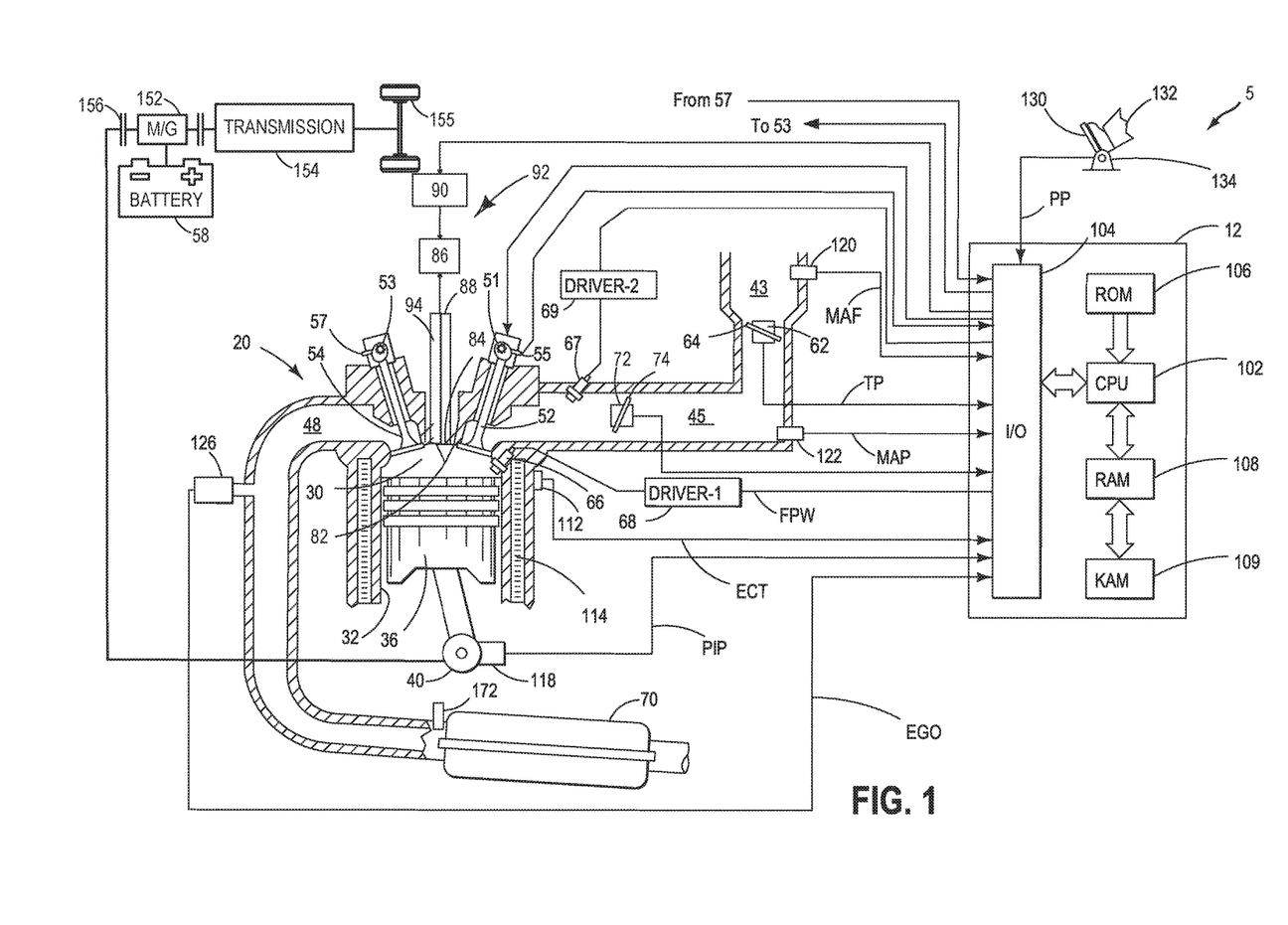
FIG. 1 shows an example combustion chamber of an internal combustion engine configured with a laser ignition system.

Methods and systems are provided for diagnosing the laser of a laser ignition system, such as the system of FIG. 1. An engine controller may be configured to perform a control routine, such as the example routine of FIG. 2, to operate the laser ignition device in a sealed cylinder (FIG. 4) during a key-off condition, and then diagnose the laser ignition device coupled to the given cylinder based on a subsequent change in exhaust passage temperature. An example laser diagnostic operation is shown with reference to FIG. 3.

Turning to FIG. 1, an example hybrid propulsion system 10 is depicted. The hybrid propulsion system may be configured in a passenger on-road vehicle, such as hybrid electric vehicle 5. Hybrid propulsion system 10 includes an internal combustion engine 20. Engine 20 may be a multi-cylinder internal combustion engine, one cylinder of which is depicted in detail at FIG. 1. Engine 20 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 20 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of propulsion system 10 via an intermediate transmission system. Combustion cylinder 30 may receive intake air from intake manifold 45 via intake passage 43 and may exhaust combustion gases via exhaust passage 48. Intake manifold 45 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In the example shown, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. To enable detection of cam position, cam actuation systems 51 and 53 may have toothed wheels. The position of intake valve 52 and exhaust valve 54 may be determined by cam position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. Fuel injector 67 is shown arranged in intake passage 43 in a configuration that provides what is known as port injection of fuel into the intake port upstream of combustion cylinder 30. Fuel injector 67 delivers fuel into the intake port in proportion to the pulse width of signal FPW-2 received from controller 12 via electronic driver 69. In this manner, fuel injector 67 provides what is known as port injection of fuel into combustion cylinder 30.

Intake passage 43 may include a charge motion control valve (CMCV) 74 and a CMCV plate 72 in addition to a throttle 62 having a throttle plate 64. In this particular example, the position of throttle plate 64 may be varied by controller 12 via a signal (TP) provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 43 may include a mass air flow sensor 120 and a manifold air pressure sensor 122 for providing respective signals MAF and MAP to controller 12.

Exhaust gas sensor 126 is shown coupled to exhaust passage 48 upstream of an emission control device 70. Emission control device (ECD) 70 may include one or more catalytic converters and particulate matter filters. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOR, HC, or CO sensor. The exhaust system may include light-off catalysts and underbody catalysts, as well as exhaust manifold, upstream and/or downstream air/fuel ratio sensors. ECD 70 can include multiple catalyst bricks, in one example. In another example, multiple emission control devices, each with multiple bricks, can be used. ECD 70 can be a three-way type catalyst in one example.

In still further example, ECD 70 may include a particulate matter filter for retaining particulate matter (PM) emissions, such as soot and ash, from exhaust gas, before the gas is released to the atmosphere via a tailpipe. The filter may include one or more temperature and/or pressure sensors, such as temperature sensor 172, for estimating a PM load on the filter. The sensor may be coupled to the filter or multiple sensors may be coupled across the filter. For example, the PM load may be inferred based on a pressure or temperature differential across the filter. As elaborated herein, during selected key-off conditions, temperature sensor 172 may also be used for diagnosing a cylinder laser ignition system.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 109, and a data bus. The controller 12 may receive various signals and information from sensors coupled to engine 20, in addition to those signals previously discussed, including measurement of inducted mass air flow (MAF) from mass air flow sensor 120; engine coolant temperature (ECT) from temperature sensor 112 coupled to cooling sleeve 114; in some examples, a profile ignition pickup signal (PIP) from Hall effect sensor 118 (or other type) coupled to crankshaft 40 may be optionally included; throttle position (TP) from a throttle position sensor; and absolute manifold pressure signal, MAP, from sensor 122.

The Hall effect sensor 118 may optionally be included in engine 20 because it functions in a capacity similar to the engine laser system described herein. Storage medium read-only memory 106 can be programmed with computer readable data representing instructions executable by processor 102 for performing the methods described below as well as variations thereof.

Engine 20 further includes a laser ignition system 92 for igniting an air-fuel mixture in cylinder 30. Laser ignition system 92 includes a laser exciter 88 and a laser control unit (LCU) 90. LCU 90 causes laser exciter 88 to generate laser energy. LCU 90 may receive operational instructions from controller 12. Laser exciter 88 includes a laser oscillating portion 86 and a light converging portion 84. The light converging portion 84 converges laser light generated by the laser oscillating portion 86 on a laser focal point 82 of combustion cylinder 30. In one example, light converging portion 84 may include one or more lenses.

A photodetector 94 may be located in the top of cylinder 30 as part of laser system 92 and may receive return pulses from the top surface of piston 36. Photodetector 94 may include a camera with a lens. In one example, the camera is a charge coupled device (CCD). The CCD camera may be configured to detect and read laser pulses emitted by LCU 90. In one example, when the LCU emits laser pulses in an infra-red frequency range, the CCD camera may operate and receive the pulses in the infra-red frequency range. In such an embodiment, the camera may also be referred to as an infrared camera. In other embodiments, the camera may be a full-spectrum CCD camera that is capable of operating in a visual spectrum as well as the infra-red spectrum. The camera may include a lens, such as a fish-eye lens, for focusing the detected laser pulses and generating an image of the interior of the cylinder. After laser emission from LCU 90, the laser sweeps within the interior region of cylinder 30. In one example, during cylinder laser ignition as well as during conditions when a cylinder piston position is to be determined, the laser may sweep the interior region of the cylinder at laser focal point 82. Light energy that is reflected off of piston 36 may be detected by the camera in photodetector 94.

It will be appreciated that while laser system 92 is shown mounted to a top of the cylinder, in alternate examples, the laser system may be configured with the laser exciter mounted on the side of the cylinder, substantially facing the valves.

Laser system 92 is configured to operate in more than one capacity with the timing and output of each operation based on engine position of a four-stroke combustion cycle. For example, laser energy may be utilized for igniting an air/fuel mixture during a power stroke of the engine, including during engine cranking, engine warm-up operation, and warmed-up engine operation. Fuel injected by fuel injector 66 may form an air/fuel mixture during at least a portion of an intake stroke, where igniting of the air/fuel mixture with laser energy generated by laser exciter 88 commences combustion of the otherwise non-combustible air/fuel mixture and drives piston 36 downward. Furthermore, light generated during the cylinder combustion event may be used by photodetector 94 for capturing images of an interior of the cylinder and assessing progress of the combustion event (e.g., for monitoring flame front progression).

In a second operating capacity, LCU 90 may deliver low powered pulses to the cylinder. The low powered pulses may be used to determine piston and valve position during the four-stroke combustion cycle. In addition, upon reactivating an engine from idle-stop conditions, laser energy may be utilized to monitor the position, velocity, etc. of the engine in order to synchronize fuel delivery and valve timing. Furthermore, light generated by the laser light pulse emission at the lower power may be used for capturing images of an interior of the cylinder before a cylinder combustion event occurs, such as during an intake stroke.

Controller 12 controls LCU 90 and has non-transitory computer readable storage medium including code to adjust the power output and location of laser energy delivery. Laser energy may be directed at different locations within cylinder 30. Controller 12 may also incorporate additional or alternative sensors for determining the operational mode of engine 20, including additional temperature sensors, pressure sensors, torque sensors as well as sensors that detect engine rotational speed, air amount and fuel injection quantity.

As described above, FIG. 1 shows one cylinder of multicylinder engine 20, and each cylinder may similarly include its own set of intake/exhaust valves, fuel injector, laser ignition system, etc.

The laser system 92 may be prone to degradation. For example, if exciter 88 does not function, a laser beam is not output into the cylinder even after receiving a command from LCU 90. As such, this can result in no cylinder torque being produced and a misfire event occurring. To better differentiate laser degradation induced misfires from other misfires, such as spark plug or air-fuel ratio induced misfires, the engine controller may intermittently and opportunistically diagnose the laser system. Specifically, the controller may leverage the ability of the laser exciter to heat a metallic object, such as the inside of the combustion chamber, when the laser beam strikes it. By relying on this motive energy to heat the charge in a sealed cylinder during selected key-off conditions, and measuring the effect on exhaust temperature when the heated charge is released from the sealed cylinder, the controller may identify laser degradation, as elaborated at FIG. 2.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 152. Electric machine 152 may be a motor or a motor/generator. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 140 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 58 to provide torque to vehicle wheels 155. Electric machine 152 may also be operated as a generator to provide electrical power to charge battery 58, for example during a braking operation.

The controller 12 receives signals from the various sensors of FIG. 1 and employs the various actuators of FIG. 1 to adjust engine and vehicle operation based on the received signals and instructions stored on a memory of the controller. For example, responsive to a duration having elapsed since a key-off condition, the controller may wake up from sleep, spin the engine unfueled via a motor to establish a baseline exhaust temperature, and heat the charge inside the sealed cylinder via operation of the laser ignition system. Then, the heated charge may be released from the sealed cylinder and the controller may diagnose the laser ignition system based on the output of an exhaust passage temperature sensor, such as temperature sensor 172 coupled to the exhaust particulate matter filter.

In this way, the components of FIG. 1 enables an engine system comprising an engine cylinder; a laser ignition device coupled to the cylinder; an exhaust temperature sensor; an electric motor; and a controller with computer-readable instructions stored on non-transitory memory for: waking up a powertrain control module from a sleep mode when a threshold duration has elapsed following an engine key-off; spinning the engine, unfueled via the motor, to establish a baseline exhaust temperature; sealing the cylinder by spinning the engine, unfueled via the motor, to a position where all cylinder valves are closed; operating the laser ignition device in the sealed cylinder for a duration; unsealing the cylinder by re-spinning the engine, unfueled via the motor, to a position where at least an exhaust valve is open; and diagnosing the laser ignition device by comparing an exhaust temperature measured after the operating with the baseline exhaust temperature. Additionally or optionally, the system further comprises a humidity sensor for estimating an ambient humidity, wherein the comparing includes comparing a difference between the measured exhaust temperature and the baseline exhaust temperature to a threshold based on an estimated ambient humidity, and wherein the diagnosing includes indicating that the laser ignition device is degraded when the difference is higher than the threshold. In one example, the controller may include further instructions for, responsive to the indicating that the laser ignition device of the cylinder is degraded, during a subsequent engine restart from rest, disabling fueling and operation of the laser ignition device of the cylinder, and adjusting a misfire threshold of the cylinder. Additionally or optionally, the controller may spin the engine at an engine speed lower than engine cranking speed.

Figure 2:
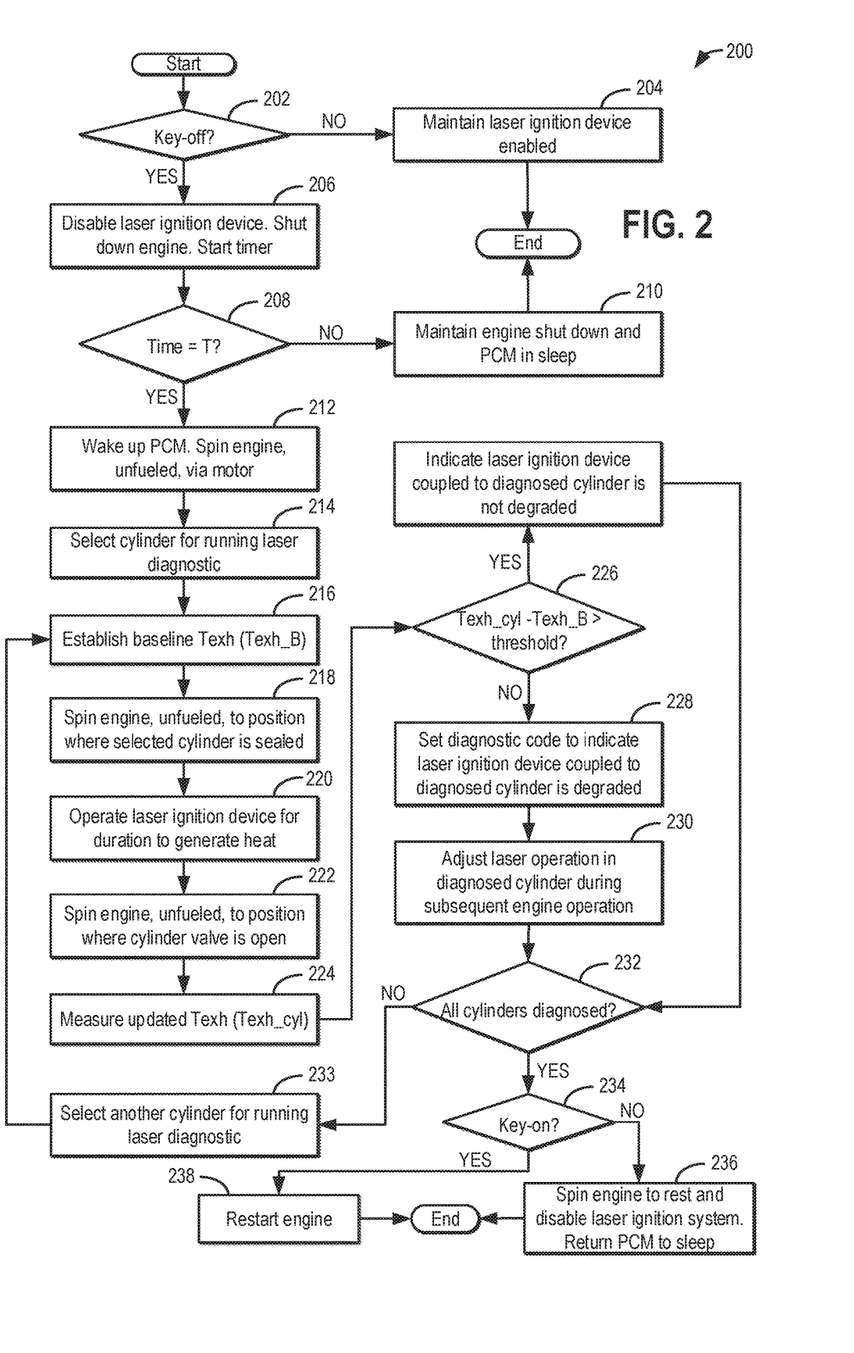
FIG. 2 shows a high level flow chart of a method for diagnosing the laser ignition system.

Turning now to FIG. 2, an example method 200 is shown for diagnosing a laser ignition system. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes confirming if there is a key-off condition. In one example, a key-off condition may be confirmed responsive to a vehicle operator moving an ignition key to an off position, removing the ignition key, pressing an ignition off button, or removing a passive key from a vehicle cabin. Still other approaches may be used to confirm that engine ignition has been disabled. If a key-off is not confirmed, then at 204, the laser ignition device of the engine is maintained enabled and the engine continues to combust fuel.

At 206, upon confirming the key-off condition, the laser ignition device may be disabled. For example, the controller may send a signal to the LCU controlling the laser to disable power to the laser exciter. In addition, the engine may be shut down by disabling fuel to the engine and spinning the engine to rest. Further, the engine controller may be put the processor (e.g., powertrain control module, PCM) to a sleep mode and start a timer. The sleep mode may be available in some PCMs whereby the PCM has an alarm clock that stays alive even after the engine is shut down to wake-up the controller without a key-on event at a designated alarm time. Prior to entering the sleep mode, the PCM is programmed to awaken at the designated alarm time (e.g., in a defined number of hours).

At 208, it may be determined if a threshold duration T has elapsed since the key-off on the timer. For example, it may be determined if a number of hours (e.g., 6 hours) have elapsed since the key-off. In one example, the threshold duration T may be based on a time required for the engine temperature to reduce to ambient conditions, such as a time required for engine coolant temperature to equilibrate with ambient air temperature. The threshold duration may be determined as a function of the ambient temperature, the duration reduced as the ambient temperature increases. If the threshold duration has not elapsed, at 210, the engine is maintained shut down and the PCM is maintained in the sleep mode.

At 212, responsive to the threshold duration having elapsed since the key-off, the processor is transitioned out of the sleep mode, thereby "waking up" the processor. In addition, the engine is spun unfueled via a motor, such as an electric starter motor, or an electric motor of the hybrid vehicle's driveline. The engine speed may be low enough to flow air through all the engine cylinders to establish a baseline exhaust temperature. In one example, the PCM wakes up and activates the motor to spin the engine unfueled engine at 500 RPM for 15 seconds.

At 214, the method includes selecting a cylinder for running the laser diagnostics. In one example, the cylinder that is next in the firing order (or the cylinder which will be the first to fire on the subsequent engine restart) may be selected as the first cylinder to be diagnosed. In another example, a cylinder may be selected based on the order of diagnosing the lasers on the last iteration of the diagnostic, the most recently diagnosed cylinder on the last iteration being diagnosed last on the current iteration. In still further examples, the cylinder may be selected according to a predefined order or based on the location of the cylinder on the engine block.

At 216, the method includes establishing a baseline exhaust temperature (Texh_B) for an unfueled and un-combusted exhaust stream with all cylinders laser ignitors deactivated. Specifically, the engine spinning is stopped so that the baseline for the exhaust temperature can be established. For example, after spinning the engine unfueled, a temperature of the exhaust stream may be measured by a GFP filter temperature sensor, if available, or an alternate exhaust passage temperature sensor.

At 218, the method includes spinning the engine unfueled, again, to a position where the selected cylinder is sealed. Here the engine may be spun slower than when the engine was spun for establishing the baseline exhaust temperature. For example, the engine may be spun at a speed of 300 RPM until the cylinder is in a position where the intake and exhaust valves of the cylinder are closed. In one example, the engine is spun slowly until a position of complete negative intake to exhaust valve overlap is reached.

Figure 4:
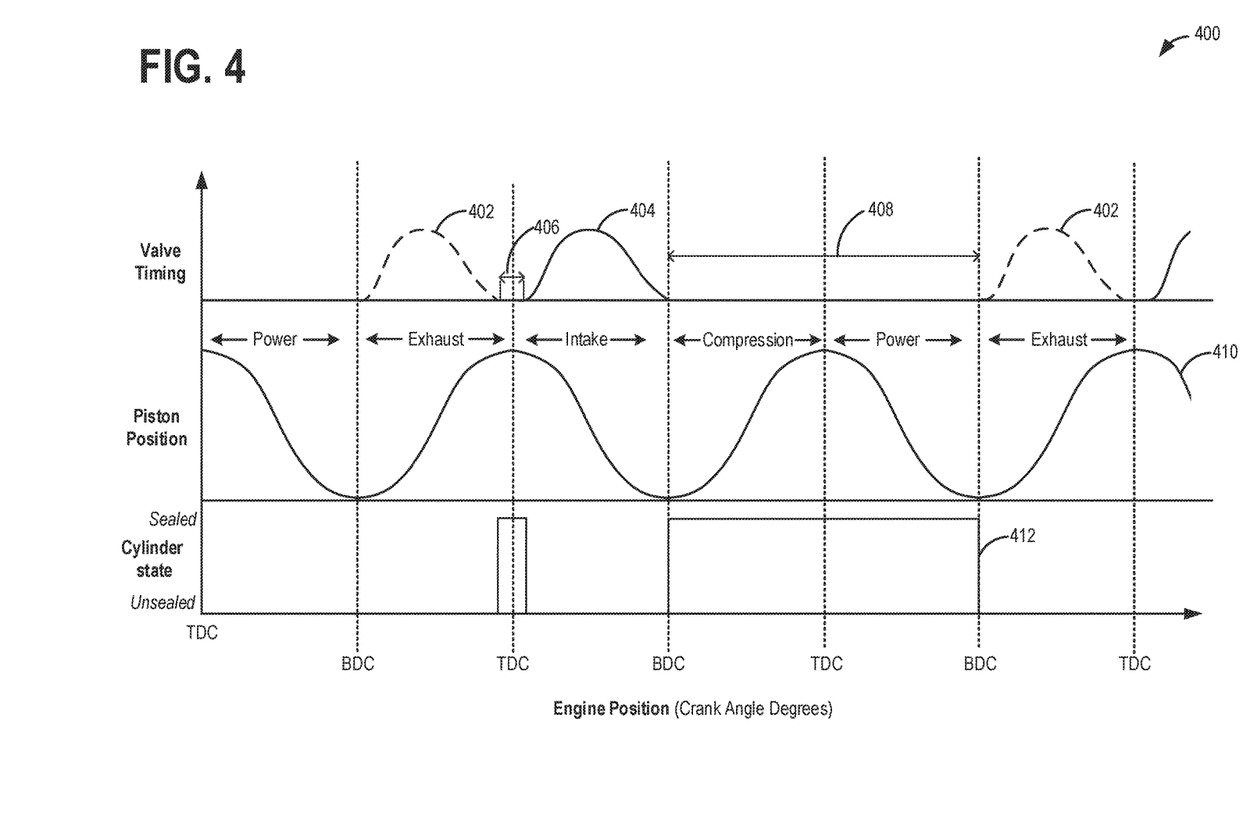
FIG. 4 shows an example map for selecting a cylinder position where cylinder valves are closed.

In one example, the controller may refer to a map, such as the example map 400 of FIG. 4, to select a position where the cylinder is sealed. Turning briefly to FIG. 4, map 400 depicts valve timing and piston position, with respect to an engine position, for a given engine cylinder. Map 400 illustrates an engine position along the x-axis in crank angle degrees (CAD). Curve 410 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 410, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 402 and 404 depict valve timings for an exhaust valve (dashed curve 402) and an intake valve (solid curve 404) during engine operation. As illustrated, an exhaust valve may be opened just as the piston bottoms out at the end of the power stroke. The exhaust valve may then close as the piston completes the exhaust stroke. In the same way, an intake valve may be opened at or before the start of an intake stroke, and may close just as the piston bottoms out at the end of the intake stroke. As a result of the timing differences between exhaust valve closing and intake valve opening, for a short duration depicted herein at 406, before the end of the exhaust stroke and after the commencement of the intake stroke, both intake and exhaust valves of the given cylinder may be closed. This period, during which both valves may be closed, is referred to as a negative intake to exhaust valve overlap 406 (or simply, negative valve overlap). During this time, the cylinder is sealed to the atmosphere, as indicated at plot 412. During a laser diagnostic, the controller may spin the engine unfueled to a position where a cylinder that is being diagnosed is at a position within the region of negative valve overlap 406 so that the laser can be operated in the sealed cylinder.

Alternatively, the controller may spin the engine unfueled to position the cylinder within region 408. Region 408 corresponds to another region where the cylinder is sealed. Region 408 is a duration between intake valve closing and exhaust valve opening where both intake and exhaust valves of the given cylinder may be closed. Herein, the intake stroke and exhaust stroke being referred to are for the same combustion event/cycle while in the case of the negative valve overlap region 406, the intake stroke is for a combustion event/cycle immediately following the combustion event/cycle of the exhaust stroke.

In one example, the engine controller may seal the cylinder by spinning the engine to a position within negative valve overlap 406 during the laser diagnostic to take advantage of the smaller amount of air trapped inside the sealed cylinder. This may allow for improved heating of the trapped during laser operation (when the laser is functional). In another example, the controller may not seal the cylinder by spinning to a position within region 408 due to the possibility of cylinder compression heating (due to the movement of the piston within the cylinder during the compression stroke) generating heat distinct from the laser operation, and potentially corrupting the results of the laser diagnostic. For example, the air trapped within the sealed cylinder may be heated due to the compression heating, even if the laser is operated while it is not functional. As a result, the laser device of the cylinder may be deemed to be not degraded when it actually is degraded (that is, a false negative result).

Returning to FIG. 2, at 220, the laser ignition device is operated for a duration in the sealed cylinder to generate heat. In particular, the laser ignition device is operated at the higher (or highest) power intensity, normally used for initiating cylinder combustion, the laser beam directed towards cylinder walls. In one example, the duration of operating the laser is 3 minutes). Since the deactivated cylinder is sealed by its parking state, with both intake and exhaust valves closed, the heat energy generated by the laser operation is trapped inside the sealed cylinder. In configurations where the laser is maneuverable, the laser energy may be focused on an area near the exhaust valve to achieve more localized heat as that is the exit point for air out of the cylinder. Else, the laser energy may be directed towards the top of the piston. Operating the laser for the duration may include the controller sending a duty cycle or pulse-width signal to the laser exciter to operate the laser at its highest power setting for the defined duration. After the duration of operation, the laser is disabled.

At 222, the method includes spinning the engine unfueled, again, to a position where the selected cylinder is unsealed. Here the engine may be spun slower than when the engine was spun for establishing the baseline exhaust temperature. For example, the engine may be spun at a speed of 300 RPM until at least the exhaust valve of the cylinder is opened. This enables the charge that was heated via the laser operation to be released into the exhaust passage). At 224, the method includes re-measuring the exhaust temperature (Texh_cyl), such as via the exhaust temperature sensor. Next, at 226, the method includes determining if there is evidence of an increase in the exhaust temperature. For example, a difference between the exhaust temperature measured after operating the laser (Texh_cyl) and the baseline temperature (Texh_B) may be determined and the difference may be compared to a threshold. The threshold may be based on ambient conditions including ambient humidity. For example, as the ambient humidity increases, the threshold may be lowered. As ambient humidity increases, the amount of heat lost from laser operation to the ambient humid air increases, due to the higher heat absorbing ability of humid air. As another example, as the ambient temperature increases, the threshold may be lowered. In one example, the controller may refer to a look-up table stored in the controller's memory. The look-up table may use the ambient conditions as input and may output a threshold to be used for laser diagnostics. The threshold may alternatively be determined via a model or algorithm.

If the difference between the exhaust temperature after laser operation in a given cylinder and the baseline temperature is higher than the threshold, then at 226, the method includes indicating that the laser device coupled to the given cylinder that was diagnosed is not degraded. The method then moves to 232 to determine if all engine cylinders have been diagnosed. If not, then the method moves to 233 to select another cylinder for performing the laser diagnostics. The next cylinder may be selected based on the firing order, based on a predefined order, based on the location of the cylinder on the engine block, or based on the order or completing the laser diagnostics on the last iteration of the routine.

If the difference between the exhaust temperature after laser operation in the given cylinder and the baseline temperature is lower than the threshold, then at 228, it may be inferred that sufficient heat was not generated during the laser operation. Accordingly, responsive to the difference being lower than the threshold, the method includes indicating that the laser device coupled to the given cylinder that was diagnosed is degraded. The controller may then set a diagnostic code including a unique identifier to indicate that the laser device of the most recently diagnosed cylinder is degraded. Further, at 230, the method includes setting a flag to adjust operation of the degraded laser device coupled to the diagnosed cylinder when the engine is subsequently operated fueled. For example, when the engine is restarted, the controller may disable fuel in the diagnosed cylinder responsive to the laser ignition device of that cylinder being degraded. In still further examples, a misfire threshold of the given cylinder may be adjusted. The method then moves to 233 to select another cylinder for performing the laser diagnostics, as discussed earlier.

From 233, the method returns to 216 to re-establish the baseline exhaust temperature. This includes the engine being spun unfueled via the motor to cool the engine. The engine may be spun for a duration that enables a sufficient amount of air to pass through the cylinders and ensure sufficient cooling. In one example, the engine is spun at 500 RPM for 15 seconds.

Returning to 232, if all the cylinders have been diagnosed, then at 234, a key-on condition may be confirmed. In one example, a key-on condition may be confirmed responsive to a vehicle operator moving an ignition key to an on position, inserting the ignition key, pressing an ignition on button, or placing a passive key into a vehicle cabin. Still other approaches may be used to confirm that engine ignition has been enabled. If a key-on is not confirmed, then at 236, the laser ignition device of the engine is disabled, the engine is spun down to rest (by disabling the motor), and the PCM is returned to sleep. Else, if a key-on condition is confirmed, then at 238, the engine is restarted. This includes cranking the engine via the starter motor up till an engine cranking speed and then resuming cylinder fueling. The engine is then spun by combusting fuel in the engine cylinders, the air-fuel mixture in each cylinder ignited via operation of the corresponding laser ignition device. In this way, the laser ignition device coupled to each cylinder of the engine can be reliably diagnosed taking advantage of the metal heating ability of the laser.

In this way, an engine controller may spin an engine unfueled to establish a baseline exhaust temperature and then seal a cylinder at a position where all cylinder valves are closed (such as at a position of negative valve overlap). The controller may then operate a laser ignition device in the sealed cylinder; then spin the engine unfueled to unseal the cylinder; and then diagnose the laser ignition device based on a change in measured exhaust temperature relative to the baseline exhaust temperature. In one example, the diagnosing may include, responsive to the measured exhaust temperature exceeding the baseline exhaust temperature by a threshold, indicating that the laser ignition device is not degraded; and responsive to the measured exhaust temperature not exceeding the baseline exhaust temperature by the threshold, indicating that the laser ignition device is degraded. Additionally, the controller may select the threshold as a function of ambient conditions including ambient humidity. For example, the threshold may be decreased from a nominal value as the ambient humidity increases. Further, responsive to the indicating that the laser ignition device is degraded, the controller may adjust a misfire threshold of the cylinder. In one example, where the cylinder is a first cylinder of the engine, the controller may indicate that the laser ignition device is degraded by setting a diagnostic code with a unique identifier for the first cylinder. The controller may then proceed to diagnose the laser ignition device coupled to each remaining engine cylinder. For example, after completing the diagnosis in the first cylinder, the controller may re-spin the engine unfueled to reestablish the baseline exhaust temperature and then diagnose a second cylinder. Spinning the engine unfueled may include spinning the engine via an electric motor, the electric motor including a starter motor and a hybrid vehicle driveline motor. Further, spinning the engine unfueled may include initially spinning the engine at a first speed for a first duration to establish the baseline exhaust temperature; then spinning the engine at a second speed, lower than the first speed, and for a second duration, smaller than the second duration to seal the cylinder by moving to the position of negative valve overlap; and then spinning the engine at the second speed for a third duration, smaller than the second duration, to unseal the cylinder by moving to another position where at least an exhaust valve is open. Herein, the exhaust temperature may be measured via a temperature sensor coupled to a particulate filter in an exhaust passage of the engine. Spinning the engine unfueled may include waking up a powertrain control module from a sleep mode and spinning the engine after a threshold duration has elapsed since an engine key-off event. After the diagnosis is completed for all engine cylinders, the powertrain control module may be returned to the sleep mode.

Figure 3:
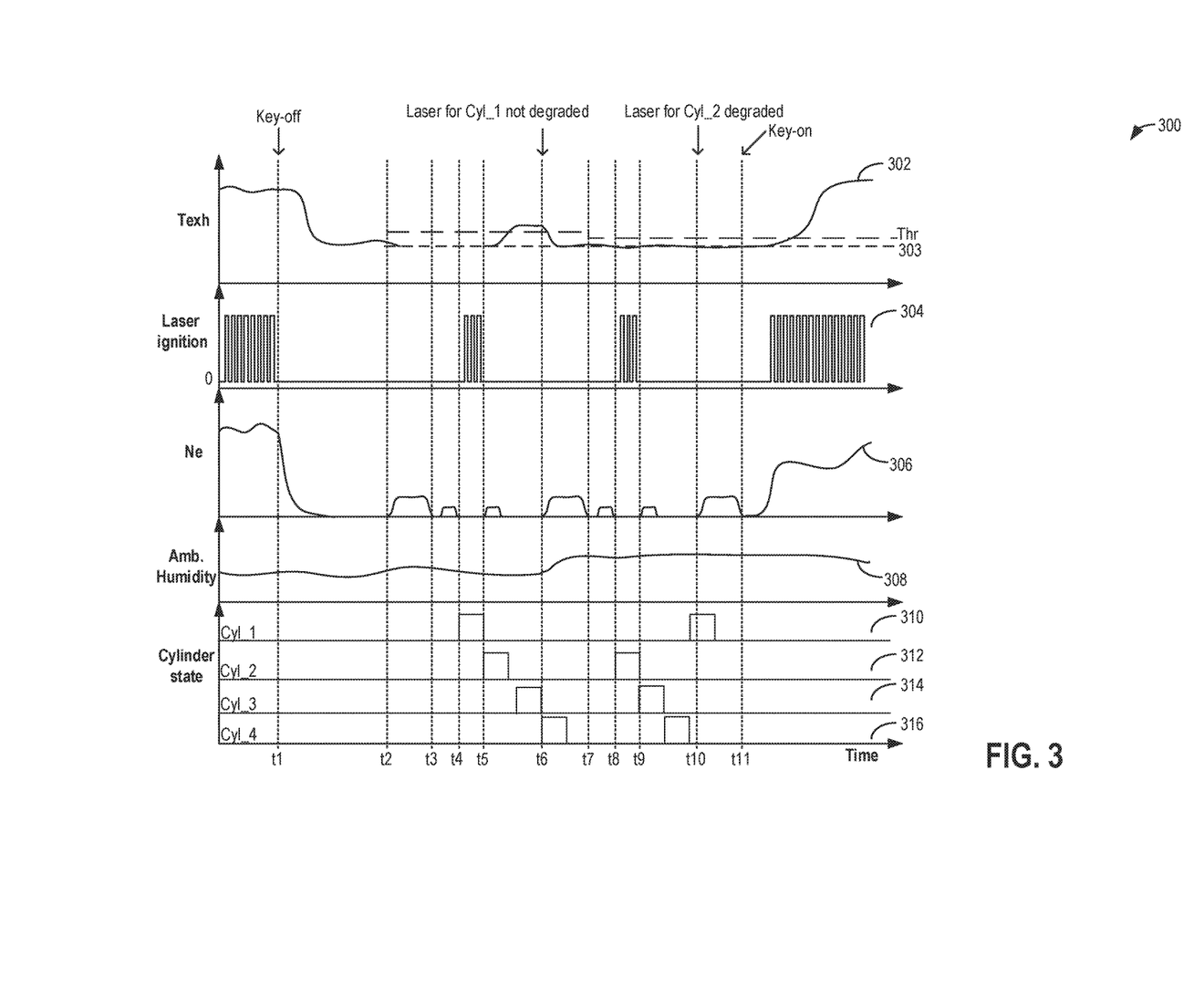
FIG. 3 shows an example diagnosis of the laser ignition system of an engine.

Turning now to FIG. 3, an example operation of a laser ignition system (such as the laser system of FIG. 1) for diagnosing a laser ignition system, is shown at map 300. Map 300 depicts measured exhaust temperature at plot 302, laser ignition device operation at plot 304, engine speed (Ne) at plot 306, and ambient humidity at plot 308. The state of each engine cylinder (Cylinders 1-4), specifically whether they are fully sealed or not, is indicated at plots 310-316. All plots are shown over time, along the x-axis.

Prior to t1, the engine of a vehicle is operating fueled. The engine rotates at a speed (plot 306) based on the operator torque demand. Fuel in each cylinder is ignited by operating the corresponding laser ignition device (plot 304) on each combustion event at an output that enables cylinder combustion. Due to cylinder combustion occurring, the exhaust temperature is elevated (plot 302). At this time, the ambient humidity is lower (plot 308), such as due to the vehicle travelling through a dry, arid region.

At t1, the vehicle operator removes the key from the ignition and a key-off condition is confirmed. Responsive to the key-off condition, the engine is shut down including engine fueling and ignition being disabled. As a result of cylinder combustion being discontinued, the exhaust temperature starts to drop.

At t2, a sufficient duration has elapsed since the key-off and the exhaust temperature has equilibrated with the ambient temperature. At this time, the controller determines that laser ignition system diagnostics can be run. Therefore at t2, the engine is spun unfueled via a motor for a duration from t2 and t3. A baseline exhaust temperature 303 is established via the unfueled engine spinning. At t3, the engine is spun unfueled again for a duration t3 to t4 (shorter than the duration t2 to t3), at a speed lower than then spinning to establish the baseline temperature. The short, slow spin at t3 to t4 moves a first cylinder to be diagnosed (Cyl_1) to a position where the cylinder is sealed (plot 310), and both the intake and exhaust valve of the cylinder are closed. The remaining cylinders are not sealed at this time (plots 312-316). Between t4 and t5, while holding the first cylinder in the sealed state, the laser ignition device of the cylinder is operated without delivering fuel to the cylinder. As a result of the laser operation, the air in the sealed cylinder is heated. At t5, the engine is spun unfueled again for a short duration (herein at the same speed and the same duration as between t3 and t4) to move the first cylinder from the fully sealed position to a position where at least the exhaust valve is open. Then, the engine spinning is stopped and a change in exhaust temperature is monitored. In the depicted example, following laser operation in Cyl_1, a rise in exhaust temperature is observed. Specifically, the exhaust temperature rises above threshold Thr which is based on the ambient humidity. Due to the exhaust temperature rising above the threshold, at t6, it is determined that the laser coupled to Cyl_1 is not degraded.

Between t6 and t7, the engine is spun unfueled again for a duration to cool the engine and reestablish the baseline temperature. In the depicted example, the engine is spun at the same speed as was used between t2 and t3, and the same baseline temperature is established. However, in other examples, the baseline may be reestablished following engine spinning for the duration. Also between t6 and t7, the ambient humidity increases, such as due to rain or other form of precipitation (e.g., snow, sleet, etc.). As a result of the increase in ambient humidity, the threshold Thr is lowered (relative to its earlier value) due to the higher heat absorbing ability of the humid air.

After the baseline exhaust temperature 303 is established via the unfueled engine spinning, at t7, the engine is spun unfueled for a duration t7 to t8 (shorter than the duration t6 to t7), at a speed lower than the spinning to establish the baseline temperature. The short, slow spin at t7 to t8 moves a second cylinder to be diagnosed (Cyl_2) to a position where the cylinder is sealed (plot 312), and both the intake and exhaust valve of the cylinder are closed. The remaining engine cylinders are not sealed at this time. Between t8 and t9, while holding the cylinder in the sealed state, the laser ignition device of the cylinder is operated without delivering fuel to the cylinder. As a result of the laser operation, the air in the sealed cylinder is heated. At t9, the engine is spun unfueled again for a short duration (herein at the same speed and the same duration as between t7 and t8) to move the cylinder from the sealed position to a position where at least the exhaust valve is open. Then, the engine spinning is stopped and a change in exhaust temperature is monitored. In the depicted example, following laser operation in Cyl_2, an insufficient rise in exhaust temperature is observed. Specifically, the exhaust temperature does not rise above humidity adjusted threshold Thr. Due to the exhaust temperature not rising above the threshold, at t10, it is determined that the laser coupled to Cyl_2 is degraded and a diagnostic code including an identifier for Cyl_2 is set.

Between t10 and t11, the engine is spun unfueled for a duration to reestablish the baseline temperature so that a next cylinder can be diagnosed. However at t11, before the next cylinder can be diagnosed, a key-on condition is confirmed responsive to the operator inserting a key into the ignition. Therefore at t11, the engine is restarted. This includes the engine being cranked by the motor until a cranking speed is reached, and then engine fueling being resumed. In addition, cylinder ignition via the laser ignition device is resumed. As a result of combustion of fuel in the engine, the engine speed starts to increase and the exhaust temperature starts to rise.

In this way, an engine controller may operate a laser ignition device in a sealed, unfueled engine cylinder after an engine key-off; compare a measured exhaust temperature after the operating to a baseline exhaust temperature established via unfueled engine spinning; and diagnose the laser ignition device based on the comparing. The comparing may include the controller calculating a difference between the measured exhaust temperature and the baseline exhaust temperature, and comparing the difference to a threshold, the threshold adjusted as a function of ambient humidity. When the difference is higher than the threshold, the controller may indicate that the laser ignition device of the engine cylinder is not degraded; and when the difference is lower than the threshold, the controller may indicate that the laser ignition device of the engine cylinder is degraded. The controller may then maintain a misfire threshold of the cylinder when the laser ignition device is indicated to not be degraded; while adjusting the misfire threshold of the cylinder when the laser ignition device is indicated to be degraded. The engine cylinder may be sealed by spinning the engine, unfueled, via an electric motor to a position where each of an intake valve and an exhaust valve of the cylinder is closed.

In this way, a laser ignition device of each cylinder of an engine is reliably diagnosed. By operating a laser ignition device in a sealed engine cylinder, the ability of the laser to generate heat can be used to diagnose the laser. By unsealing the cylinder after the heating, and monitoring a change in exhaust temperature relative to a pre-established baseline temperature, the absence or presence of a rise in exhaust temperature can be correlated with laser function. By monitoring the exhaust temperature following laser operation during a key-off condition, corruption of results due to noise factors from engine combustion can be reduced. By diagnosing laser degradation in a timely manner, laser degradation induced misfires can be better distinguished from spark plug or air-fuel ratio induced misfires, and accordingly mitigated.

One example method comprises spinning an engine unfueled to establish a baseline exhaust temperature and then seal a cylinder at a position of negative valve overlap; operating a laser ignition device in the sealed cylinder; spinning the engine unfueled to unseal the cylinder; and diagnosing the laser ignition device based on a change in measured exhaust temperature relative to the baseline exhaust temperature. In the preceding example, additionally or optionally, the diagnosing includes: responsive to the measured exhaust temperature exceeding the baseline exhaust temperature by a threshold, indicating that the laser ignition device is not degraded; and responsive to the measured exhaust temperature not exceeding the baseline exhaust temperature by the threshold, indicating that the laser ignition device is degraded. In any or all of the preceding examples, additionally or optionally, the method further comprises selecting the threshold as a function of ambient conditions including ambient humidity. In any or all of the preceding examples, additionally or optionally, the threshold is decreased from a nominal value as the ambient humidity increases. In any or all of the preceding examples, additionally or optionally, the method further comprises responsive to the indicating that the laser ignition device is degraded, adjusting a misfire threshold of the cylinder. In any or all of the preceding examples, additionally or optionally, the cylinder is a first cylinder of the engine and wherein indicating that the laser ignition device is degraded includes setting a diagnostic code with a unique identifier for the first cylinder. In any or all of the preceding examples, additionally or optionally, the method comprising, after the indicating, re-spinning the engine unfueled to reestablish the baseline exhaust temperature and then diagnosing a second cylinder. In any or all of the preceding examples, additionally or optionally, spinning the engine unfueled includes spinning the engine via an electric motor, the electric motor including a starter motor and a hybrid vehicle driveline motor. In any or all of the preceding examples, additionally or optionally, spinning the engine unfueled includes initially spinning the engine at a first speed for a first duration to establish the baseline exhaust temperature; then spinning the engine at a second speed, lower than the first speed, and for a second duration, smaller than the second duration to seal the cylinder by moving to the position of negative valve overlap; and then spinning the engine at the second speed for a third duration, smaller than the second duration, to unseal the cylinder by moving to another position where at least an exhaust valve is open. In any or all of the preceding examples, additionally or optionally, the exhaust temperature is measured via a temperature sensor coupled to a particulate filter in an exhaust passage of the engine. In any or all of the preceding examples, additionally or optionally, spinning the engine unfueled includes waking up an engine controller and spinning the engine after a threshold duration has elapsed since an engine key-off event.

Another example method for an engine comprises: operating a laser ignition device in a sealed, unfueled engine cylinder after an engine key-off; comparing a measured exhaust temperature after the operating to a baseline exhaust temperature established via unfueled engine spinning; and diagnosing the laser ignition device based on the comparing. In any or all of the preceding examples, additionally or optionally, the comparing includes calculating a difference between the measured exhaust temperature and the baseline exhaust temperature, and comparing the difference to a threshold, the threshold adjusted as a function of ambient humidity. In any or all of the preceding examples, additionally or optionally, the diagnosing includes when the difference is higher than the threshold, indicating that the laser ignition device of the engine cylinder is not degraded; and when the difference is lower than the threshold, indicating that the laser ignition device of the engine cylinder is degraded. In any or all of the preceding examples, additionally or optionally, the method further comprises maintaining a misfire threshold of the cylinder when the laser ignition device is indicated to not be degraded; and adjusting the misfire threshold of the cylinder when the laser ignition device is indicated to be degraded. In any or all of the preceding examples, additionally or optionally, the method further comprises sealing the engine cylinder by spinning the engine, unfueled, via an electric motor to a position where each of an intake valve and an exhaust valve of the cylinder is closed.

An example engine system comprises an engine cylinder; a laser ignition device coupled to the cylinder; an exhaust temperature sensor; an electric motor; and a controller with computer-readable instructions stored on non-transitory memory for: waking up a powertrain control module from a sleep mode when a threshold duration has elapsed following an engine key-off; spinning the engine, unfueled via the motor, to establish a baseline exhaust temperature; sealing the cylinder by spinning the engine, unfueled via the motor, to a position where all cylinder valves are closed; operating the laser ignition device in the sealed cylinder for a duration; unsealing the cylinder by re-spinning the engine, unfueled via the motor, to a position where at least an exhaust valve is open; and diagnosing the laser ignition device by comparing an exhaust temperature measured after the operating with the baseline exhaust temperature. In any or all of the preceding examples, additionally or optionally, the system further comprises a humidity sensor for estimating an ambient humidity, wherein the comparing includes comparing a difference between the measured exhaust temperature and the baseline exhaust temperature to a threshold based on an estimated ambient humidity, and wherein the diagnosing includes indicating that the laser ignition device is degraded when the difference is higher than the threshold. In any or all of the preceding examples, additionally or optionally, the controller includes further instructions for, responsive to the indicating that the laser ignition device of the cylinder is degraded, during a subsequent engine restart from rest, disabling fueling and operation of the laser ignition device of the cylinder, and adjusting a misfire threshold of the cylinder. In any or all of the preceding examples, additionally or optionally, spinning the engine, unfueled, includes spinning the engine at an engine speed lower than engine cranking speed. In another representation, the engine system is included in a hybrid electric vehicle system, wherein the electric motor is a driveline motor for propelling vehicle wheels.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
spinning an engine unfueled to establish a baseline exhaust temperature and then seal a cylinder at a position of negative valve overlap;
operating a laser ignition device in the sealed cylinder;
spinning the engine unfueled to unseal the cylinder; and
diagnosing the laser ignition device based on a change in measured exhaust temperature relative to the baseline exhaust temperature.

2. The method of claim 1, wherein the diagnosing includes:
responsive to the measured exhaust temperature exceeding the baseline exhaust temperature by a threshold, indicating that the laser ignition device is not degraded; and
responsive to the measured exhaust temperature not exceeding the baseline exhaust temperature by the threshold, indicating that the laser ignition device is degraded.

3. The method of claim 2, further comprising selecting the threshold as a function of ambient conditions including ambient humidity.

4. The method of claim 3, wherein the threshold is decreased from a nominal value as the ambient humidity increases.

5. The method of claim 2, further comprising: responsive to the indicating that the laser ignition device is degraded, adjusting a misfire threshold of the cylinder.

6. The method of claim 2, wherein the cylinder is a first cylinder of the engine and wherein indicating that the laser ignition device is degraded includes setting a diagnostic code with a unique identifier for the first cylinder.

7. The method of claim 6, further comprising, after the indicating, re-spinning the engine unfueled to reestablish the baseline exhaust temperature and then diagnosing a second cylinder.

8. The method of claim 1, wherein spinning the engine unfueled includes spinning the engine via an electric motor, the electric motor including a starter motor and a hybrid vehicle driveline motor.

9. The method of claim 1, wherein spinning the engine unfueled includes:
initially spinning the engine at a first speed for a first duration to establish the baseline exhaust temperature;
then spinning the engine at a second speed, lower than the first speed, and for a second duration, smaller than the second duration to seal the cylinder by moving to the position of negative valve overlap; and
then spinning the engine at the second speed for a third duration, smaller than the second duration, to unseal the cylinder by moving to another position where at least an exhaust valve is open.

10. The method of claim 1, wherein the exhaust temperature is measured via a temperature sensor coupled to a particulate filter in an exhaust passage of the engine.

11. The method of claim 1, wherein spinning the engine unfueled includes waking up an engine controller and spinning the engine after a threshold duration has elapsed since an engine key-off event.

12. A method for an engine, comprising:
operating a laser ignition device in a sealed, unfueled engine cylinder after an engine key-off;
comparing a measured exhaust temperature after the operating to a baseline exhaust temperature established via unfueled engine spinning; and
diagnosing the laser ignition device based on the comparing.

13. The method of claim 12, wherein the comparing includes calculating a difference between the measured exhaust temperature and the baseline exhaust temperature, and comparing the difference to a threshold, the threshold adjusted as a function of ambient humidity.

14. The method of claim 13, wherein the diagnosing includes:
when the difference is higher than the threshold, indicating that the laser ignition device of the engine cylinder is not degraded; and
when the difference is lower than the threshold, indicating that the laser ignition device of the engine cylinder is degraded.

15. The method of claim 14, further comprising:
maintaining a misfire threshold of the cylinder when the laser ignition device is indicated to not be degraded; and
adjusting the misfire threshold of the cylinder when the laser ignition device is indicated to be degraded.

16. The method of claim 12, further comprising, sealing the engine cylinder by spinning the engine, unfueled, via an electric motor to a position where each of an intake valve and an exhaust valve of the cylinder is closed.

17. An engine system, comprising:
an engine cylinder;
a laser ignition device coupled to the cylinder;
an exhaust temperature sensor;
an electric motor; and
a controller with computer-readable instructions stored on non-transitory memory for:
waking up a powertrain control module from a sleep mode when a threshold duration has elapsed following an engine key-off;
spinning the engine, unfueled via the motor, to establish a baseline exhaust temperature;
sealing the cylinder by spinning the engine, unfueled via the motor, to a position where all cylinder valves are closed;
operating the laser ignition device in the sealed cylinder for a duration;
unsealing the cylinder by re-spinning the engine, unfueled via the motor, to a position where at least an exhaust valve is open; and
diagnosing the laser ignition device by comparing an exhaust temperature measured after the operating with the baseline exhaust temperature.

18. The system of claim 17, further comprising a humidity sensor for estimating an ambient humidity, wherein the comparing includes comparing a difference between the measured exhaust temperature and the baseline exhaust temperature to a threshold based on an estimated ambient humidity, and wherein the diagnosing includes indicating that the laser ignition device is degraded when the difference is higher than the threshold.

19. The system of claim 18, wherein the controller includes further instructions for, responsive to the indicating that the laser ignition device of the cylinder is degraded, during a subsequent engine restart from rest, disabling fueling and operation of the laser ignition device of the cylinder, and adjusting a misfire threshold of the cylinder.

20. The system of claim 17, wherein spinning the engine, unfueled, includes spinning the engine at an engine speed lower than engine cranking speed.

* * * * *